(No Model.)
A. O. CHASE.
WAGON JACK.
No. 264,822. Patented Sept. 19, 1882.
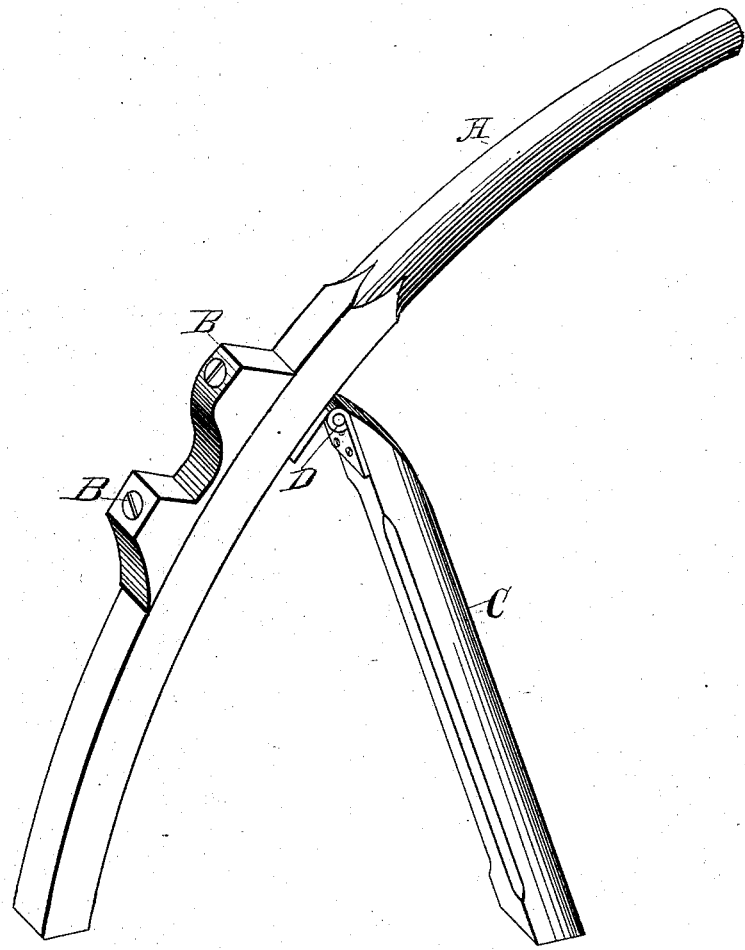
Witnesses:
C. B. Story.
Chas Litzky
Inventor:
Albert O. Chase
By Jas. B. Erwin
Attorney.

UNITED STATES PATENT OFFICE.

ALBERT O. CHASE, OF MILWAUKEE, WISCONSIN, ASSIGNOR OF ONE-HALF TO THOMAS H. BROWN, OF SAME PLACE.

WAGON-JACK.

SPECIFICATION forming part of Letters Patent No. 264,822, dated September 19, 1882.

Application filed July 29, 1882. (No model.)

*To all whom it may concern:*

Be it known that I, ALBERT O. CHASE, a citizen of the United States, residing at Milwaukee, in the county of Milwaukee and State of Wisconsin, have invented certain new and useful Improvements in Wagon-Jacks; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My invention relates to improvements in wagon-jacks or device for raising and supporting carriages.

The construction and operation of the device is explained by reference to the accompanying drawing, which represents a perspective view of the same.

A represents the lifting-lever, which may be straight, but is preferably made in the curved shape shown, and is provided with one or more shoulders, B B, adapted to engage beneath the axle of the carriage as the same is raised.

C is a brace or leg which is inserted beneath and supports the lever A, as shown. The leg or brace C is attached to the lever A by a hinge, D.

In operating the device the lower end of the lever A is placed upon the ground beneath the axle, and the carriage is raised by an upward and forward movement of said lever, the carriage being permitted to roll slightly forward with said lever as the axle is raised. As the lever is thus raised with the carriage the brace C is drawn slightly forward beneath the connecting-hinge in position to brace and support the lever, with its load, at the desired point of adjustment. If desired, the shoulders B may be substituted by recesses, which will serve the same end in retaining the axle upon said lever.

Having thus described my invention, what I claim as new, and desire to secure by Letters Patent, is—

1. The combination, with a lever provided with shoulders or recesses adapted to engage beneath a carriage-axle, of a brace pivoted to said lever beneath the axle, the lower ends of said lever and brace being respectively adapted, when supporting the carriage, to rest on the ground, substantially as and for the purpose set forth.

2. The combination of lever A, shoulder B B, hinge D, and brace C, all substantially as and for the purpose specified.

In testimony whereof I affix my signature in presence of two witnesses.

ALBERT O. CHASE.

Witnesses:
 THOS. H. BROWN,
 JAS. B. ERWIN.